United States Patent [19]

Vreeland

[11] Patent Number: 5,179,711

[45] Date of Patent: Jan. 12, 1993

[54] MINIMUM IDENTICAL CONSECUTIVE RUN LENGTH DATA UNITS COMPRESSION METHOD BY SEARCHING CONSECUTIVE DATA PAIR COMPARISON RESULTS STORED IN A STRING

[75] Inventor: Albert P. Vreeland, Tucson, Ariz.

[73] Assignee: International Business Machines Corporation, Armonk, N.Y.

[21] Appl. No.: 456,890

[22] Filed: Dec. 26, 1989

[51] Int. Cl.⁵ .......................... G06F 7/04; G06F 5/00
[52] U.S. Cl. ................................. 395/775; 395/600; 364/259.2; 364/259.4; 364/260.6; 364/DIG. 1; 341/87
[58] Field of Search ...................... 395/800, 775, 600; 341/50, 51, 87

[56] References Cited

U.S. PATENT DOCUMENTS

| | | | |
|---|---|---|---|
| 3,560,639 | 2/1971 | Centanni | 178/6 |
| 3,694,813 | 9/1972 | Loh et al. | 395/800 |
| 4,005,411 | 1/1977 | Morrin, II | 340/347 |
| 4,446,516 | 5/1984 | Nishimura | 395/425 |
| 4,491,954 | 1/1985 | Heinz | 395/775 |
| 4,573,187 | 2/1986 | Bui et al. | 381/43 |
| 4,586,027 | 4/1986 | Tsukiyama et al. | 341/95 |
| 4,626,824 | 12/1986 | Larson | 341/95 |
| 4,631,521 | 12/1986 | El-Sherbini | 340/347 |
| 4,701,745 | 10/1987 | Waterworth | 341/95 |
| 4,799,242 | 1/1989 | Vermeulen | 375/122 |
| 5,001,418 | 3/1991 | Posse et al. | 324/73.1 |
| 5,020,058 | 5/1991 | Holden et al. | 341/87 X |
| 5,033,105 | 7/1991 | Atkinson | 382/56 |
| 5,036,457 | 7/1991 | Glaser et al. | 395/650 X |

FOREIGN PATENT DOCUMENTS 55-134454 10/1980 Japan.

Primary Examiner—Thomas C. Lee
Attorney, Agent, or Firm—M. W. Schecter

[57] ABSTRACT

A method of detecting certain runs of data, such as identical consecutive runs of data, is disclosed. The logical operation exclusive OR (XOR) is performed on each pair of adjacent bytes in a source string of data bytes in a single machine instruction, resulting in a comparison data string of bytes. The comparison data string is then sequentially searched for a byte which matches a predetermined byte. In the case of a search, the predetermined byte may be any value, which value is determined by the XOR of two adjacent bytes that are to be found. In the case of compression, as used in this invention, the predetermined byte has a value of zero, indicating that two adjacent bytes in the source string are identical. The sequential search occurs in a single Translate and Test (TRT) machine instruction. Once an all-zero byte is located, the subsequent byte in the comparision data string is examined. If the subsequent byte is also an all-zero byte, three identical, consecutive bytes in the source string have been located and are considered to be compressible. Additional bytes in the identical, consecutive run of bytes are located by further searching. If the subsequent byte in the comparison data string is not also an all-zero byte, the search for an all-zero byte is restarted with the byte following the subsequent byte in the comparison data string.

4 Claims, 1 Drawing Sheet

MINIMUM IDENTICAL CONSECUTIVE RUN LENGTH DATA UNITS COMPRESSION METHOD BY SEARCHING CONSECUTIVE DATA PAIR COMPARISON RESULTS STORED IN A STRING

BACKGROUND OF THE INVENTION

1. Field of the Invention

This invention relates to a method and program for detecting certain runs of data. More particularly, the invention relates to a method and program for detecting previously specified runs of data or identical consecutive runs of data, either of which may be suitable for data compression.

2. Description of the Related Art

Modern computers require a host processor including one or more central processing units and a memory facility. The processor manipulates data stored in the memory according to instructions provided to it. The memory must therefore be capable of storing data required by the processor and transferring that data to the processor at a rate capable of making the overall operation of the computer feasible. The cost and performance of computer memory is thus critical to the commercial success of a computer system.

Because today's computers require large quantities of data storage capacity, computer memory is available in many forms. A fast but expensive form of memory is main memory, typically comprised of microchips. Other available forms of memory are known as peripheral storage devices and include magnetic direct access storage devices (DASD), magnetic tape storage devices, optical recording devices, and magnetic or optical mass storage libraries. Each of these other types of memory has a greater storage density and thus lower cost than main memory. However, these other memory devices do not provide the performance provided by main memory. For example, the time required to properly position the tape or disk beneath the read/write mechanism of the drive cannot compare with the rapid, purely electronic data transfer rate of main memory. It is inefficient to store all of the data in a computer system on but a single type of memory device. Storing all of the data in main memory is too costly and storing all of the data on one of the peripheral storage devices reduces performance.

A typical computer system includes both main memory and one or more types of peripheral storage devices arranged in a data storage hierarchy. The data storage hierarchy arrangement is tailored to the performance and cost requirements of the user. In such a hierarchy, main memory is often referred to as primary data storage, the next level of the hierarchy is often referred to as secondary data storage, and so on. Generally, the highest level of the hierarchy has the lowest storage density capability, highest performance and highest cost. As one proceeds down through the hierarchy, storage density generally increases, performance generally decreases, and cost generally decreases. By transferring data between different levels of the hierarchy as required, the cost of memory is minimized and performance is maximized. Data is thus stored in main memory only so long as it is expected to be required by the processor. The hierarchy may take many forms, include any number of data storage or memory levels, and may be able to transfer data directly between any two distinct memory levels. The transfer of data may employ I/O channels, controllers, or cache memories as is well known in the art.

Data is stored in memory in digital form as either logical 0's or logical 1's known as bits. The bits are stored in a precise order (i.e. encoded) so as to represent that data to the system in a form understood by the system. For example, a certain set (or byte) of eight bits, such as 00000000, might represent the letter "a". Also, 00000001 might represent "A", 00000010 might represent "b", and 11111111 might represent "$" etc. In addition, the bytes could actually represent any binary data. Various encoding schemes are known in the art.

The efficiency of use of a data storage hierarchy is improved if particular data can be further encoded so as to reduce the amount of storage space required in memory to retain that data. Such further encoding is generally referred to as data compaction or data compression (hereinafter simply "compression"). Certain repeated portions of data are usually replaced with coded versions thereof (hereinafter "codes"). Data is typically compressed before it is stored in a particular type of memory and decompressed upon its being read out so as to return it to a form understood by the host processor for processing. Various compression techniques are known in the art. Some background on different types of data compression can be found in U.S. Pat. No. 3,694,813.

One technique for compressing data involves the replacement of identical runs of data with codes. A run of data is any sequential series of units of data (i.e. any single portion of the data), the units of data in the run being consecutive. The units of data within a run need not be identical. For example, 0101 is a run of four bits. Identical runs of data are two or more runs which are identical to each other (i.e. 0101 and 0101 are identical runs of four bits each). A single identical run of data is impossible—there must be at least two such runs of data for them to be identical to each other. Codes are assigned to each individual portion of data which is found to repeat. The codes are shorter than the actual data as otherwise stored and may represent the repeated data in various ways, such as by referencing the memory address of where the run first appears. At each repetition of a run thereafter, the codes are used to represent such runs in memory instead of the actual data, thereby reducing the amount of memory required to store the data. Examples of this type of data compression are found in U.S. Pat. Nos. 4,446,516, 4,491,934, 4,626,824, and 4,701,745.

Another technique for compressing data involves the replacement of identical consecutive runs of data with codes. An identical consecutive run refers to a run in which each unit of data therein is the same. Thus, "identical consecutive runs" refers to a plurality of runs, each run consisting of a single repeating unit of data. The term does not imply that each of the plurality of runs is identical to each other. For example, 0000 and 1111 are each identical consecutive runs of four bits, but are not identical runs. A single identical consecutive run of data is possible as the term only refers to a run being identical throughout itself. The codes are binary data which indicate the repeated unit of data and the number of times such unit repeats (i.e. the run length). For example, a run of 78 all-zero bytes can be represented by one all-zero byte and a binary representation of the number 78. Data is thus compressed by replacing the identical consecutive runs of data with the codes. An example of this type of data compression is found in U.S. Pat. No. 4,586,027.

The aforementioned techniques relate to how data can be compressed. To be able to compress data one must first detect the presence of data which is suitable for compression. The detection of compressible data includes the identification of repeated portions of data and the number of times the portion is repeated. The number of repetitions is required to ensure that compression will indeed save memory space without unduly degrading performance. Memory space may not always be saved, as in the case where a portion is repeated but one time and the portion is so short that the code used to represent that portion is larger than the portion itself. Also, modest savings in memory space may not be worthwhile if the overhead (i.e. processing time) to perform the compression and decompression outweighs the benefit of the memory space saved. Because some of the overhead associated with data compression is the result of the detection of compressible data, it is important that such detection occur as efficiently as possible.

In the current Multiple Virtual Storage (MVS) operating system environment, a family of computer programs known as Data Facility Storage Management Subsystem can be used to manage the data storage hierarchy. An optional program in the family known as Data Facility Data Set Services (DFDSS) can be used to manage certain aspects of direct access storage devices (DASD). More particularly, DFDSS functions include the movement of data from one type of DASD to another type of DASD, the backup and recovery of data sets, and the reduction or elimination of free-space fragmentation. The backup of selected data sets is accomplished by copying or "dumping" such data sets, typically on DASD, to additional recording media, typically magnetic tape. DFDSS uses data compression in dumping data sets.

To compress data, early versions of DFDSS searched strings of bytes to locate data suitable for compression. The strings of bytes were examined to identify any identical consecutive runs of three or more bytes. The technique for detecting such runs of bytes was by simple comparison of pairs of adjacent bytes using a System/370 COMPARE LOGICAL CHARACTER machine instruction. To examine a given string of bytes for compressibility, the first byte was compared to the adjacent second byte during a first machine instruction. If the first and second bytes are identical, such was noted in a temporary storage location and the second byte and adjacent third byte were then compared during a second machine instruction. If the second and third bytes were also identical, such was again noted and it was therefore known that a compressible run of three or more identical consecutive bytes existed. The procedure then continued, comparing the third byte and adjacent fourth byte, fourth byte and adjacent fifth byte, fifth byte and adjacent sixth byte, etc. during separate machine instructions until the run of identical consecutive bytes was broken. At such time, the run was actually compressed. Searching then started anew for another run of identical consecutive bytes beginning with a comparison of the very same pair of bytes (i.e. repeating that comparison) last compared during the identification of the last run identical consecutive bytes.

Continuing with the aforementioned example, if the first and second bytes were not identical, the second and third bytes were nevertheless compared. However, no record of identical byte detection was retained as such did not occur. If the second and third bytes were found to be identical, such was noted and the comparisons continued in search of a run of three or more identical consecutive bytes, as previously described. Again, if the second and third bytes were not identical, the comparisons continued, but no record of identical byte detection was retained. The comparisons continued in this manner until the entire string of bytes was examined.

The aforementioned technique of detecting compressible data by comparing each and every pair of adjacent bytes during separate machine instructions is inefficient. A technique reducing the number of machine instructions required would improve efficiency. There is therefore a need for an improved method of detecting certain runs of data.

SUMMARY OF THE INVENTION

In view of the foregoing, it is the principal object of this invention to improve methods and programs for detecting certain runs of data.

Another object of this invention is an improved program and method for detecting previously specified or identical consecutive runs of data.

Still another object of this invention is a method and program for detecting such runs of data which reduces the required number of machine instructions.

Still another object of this invention is a method and program for data compression including the detection of such runs of data.

These and other objects of this invention are accomplished by taking advantage of certain System/370 machine instructions. The logical operation exclusive OR (XOR) is performed on each pair of adjacent bytes in a source string of data in a single machine instruction. For the operation, the source string of data bytes is first copied to a temporary string. The exclusive OR operation is then performed on the two strings in a single XOR machine instruction. The first byte in the temporary string is XOR'd with the second byte in the source string, the second byte in the temporary string is XOR'd with the third byte in the source string, the third byte in the temporary string is XOR'd with the fourth byte in the source string, and so on resulting in a comparison data string of bytes. In locating identical consecutive runs of data, the comparison data string is then sequentially searched for an all-zero byte which indicates that the XOR of the two bytes represented thereby determined the two bytes to be identical. The sequential search occurs in a single Translate and Test (TRT) machine instruction. Once an all-zero byte is located, the subsequent byte in the comparison data string is examined. If the subsequent byte is also an all-zero byte, three identical consecutive bytes in the source string have been located and are considered to be compressible. Additional bytes in the identical consecutive run of bytes are located by further searching. If the subsequent byte in the comparison data string is not also an all-zero byte, the search for an all-zero byte is restarted with the next byte (i.e. the byte in the comparison data string following the subsequent byte).

The above-described method and program reduces processing time because fewer machine instructions are required. Although an XOR instruction results in no immediate logical action based on the similarity of the operands unlike a COMPARE instruction, it is capable of executing on each pair of adjacent data bytes in a data string in a single machine instruction as opposed to a single pair of adjacent bytes.

In addition, the TRT instruction permits interpretation of the XOR results such that an all-zero byte can be located in a single machine instruction. Thus, two instructions replace a series of COMPARE instructions. Finally, by recognizing the breadth of information learned when the end of an identical consecutive run of data is located, the search for the next identical consecutive run of data can begin with the bytes immediately following the last two bytes compared, rather than beginning with those same two bytes, thereby saving additional overhead. The invention can also be used to determine the location of previously specified runs of data.

DESCRIPTION OF THE PREFERRED EMBODIMENT

Figure 1:
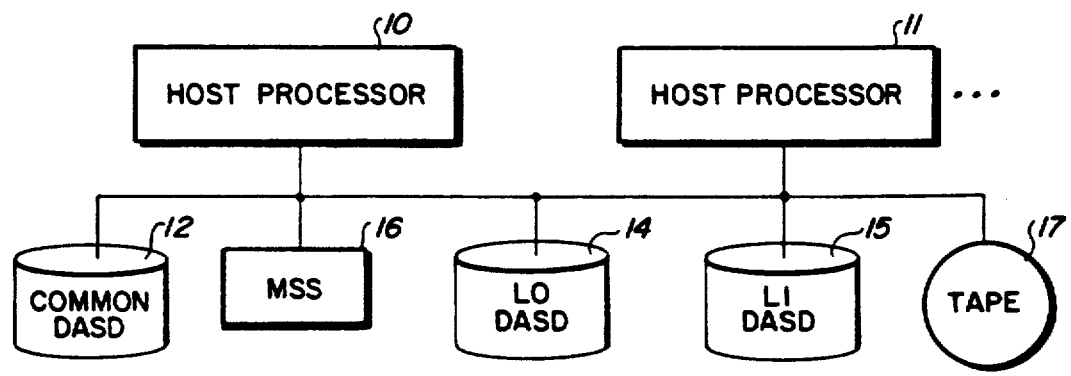
FIG. 1 is a schematic block diagram of a data storage hierarchy and computer system in which the invention can be used.

Referring now more particularly to the drawing, like numerals denote like features and structural elements in the various figures. The invention will be described as practiced in a multi-host processor data processing environment having a plurality of peripheral data storage devices of diverse types and capabilities. It should be understood that the invention may also be practiced in a single-host processor environment having a smaller number of peripheral data storage devices, or with a variety of different system structures.

Referring to FIG. 1, a data storage hierarchy in a multi-host environment will now be described. The system includes two or more host processors, a host processor 10 and a host processor 11 being shown in the figure, each of which includes the usual component portions of a host processor, such as the arithmetic logic unit, main memory, and input/output channels (not identified in FIG. 1). Each host processor can be either a uni-processor or a multi-processor. The host processors employ various operating systems not pertinent to an understanding of the present invention. An example of a host processor which may be used in the data storage hierarchy shown is the IBM 3090 mainframe computer. Within each host processor is a computer program employing the invention, as will be detailed.

Host processors 10 and 11 are connected to a common DASD 12. Common DASD 12 consists of a high performance disk-type data storage device. Stored in common DASD 12 are those control data structures (not shown) desired for coordinating operations of host processors 10 and 11 in executing a data storage management program. A high performance DASD 14 labeled L0 DASD, stores those data sets directly accessed by host processors 10 and 11 and receives data sets for storage generated by host processors 10 and 11. A lower performance DASD 15, labeled L1 DASD, stores those data sets accessed by host processors 10 and 11 less frequently than those stored on high performance DASD 14. When the data sets stored in DASD 14 become aged through non-access by host processors 10 and 11 a data storage management program automatically moves data sets from DASD 14 to DASD 15 such that data set access by host processors 10 and 11 is enhanced by keeping only those data sets that are frequently accessed by the host processors in DASD 14. DASDs 14 and 15 represent two levels of a data storage hierarchy created by the data storage management program. An example of a DASD which may be used in the data storage hierarchy shown is the IBM 3380 or 3390 DASD. Each DASD is said to store a volume of data.

A still lower level in the data storage hierarchy is represented by a mass storage system (MSS) 16, labeled MSS, and a tape drive 17, labeled TAPE. MSS 16 and DASDs 12, 14 and 15 provide for automatic accessing of all data sets stored therein. MSS 16 includes one or more means for reading and writing to recording media and automated means for transferring such media between storage cells located in MSS 16 and the means for reading and writing. The recording media may be magnetic tape, magnetic disk, or optical disk and the means for reading and writing may be tape drives or magnetic or optical disk drives as the case may be. MSS 16 may also include means for inserting or removing recording media therein. An example of a MSS which may be used in the data storage hierarchy shown is the IBM 3850 MSS. Tape drive 17 is used for archival or other long term data storage, backup and the like that is unlikely to be accessed and usually require operator intervention for mounting and demounting tapes. An example of a tape drive which may be used in the data storage hierarchy shown is an IBM 3480 magnetic tape drive. Each disk (or side thereof) or tape in MSS 16 or each tape in tape drive 17 stores a volume of data. The system operator and system console is not shown in FIG. 1 for the purpose of simplification.

In the data storage hierarchy shown, the dotted and dashed lines represent the possibility of additional system components. Several host processors could be connected substantially as shown to several data storage devices at each level of the hierarchy. The ability to add additional system components is limited only by the connectivity of each component. For simplicity, components between the levels of the data storage hierarchy, such as channels and control units, are not shown in FIG. 1.

In a typical computer using main memory as primary data storage and peripheral storage devices as secondary data storage, the processor can only access data for executing instructions if the data is stored in main memory. If work to be done by the processor requires data not then stored in main memory, the processor will recall or promote data from a peripheral storage device to main memory. The failure of the peripheral storage device in which the required data is stored can make such data unavailable to the processor. To avoid such loss of availability, data can be managed to ensure that duplicate copies exist on different peripheral storage devices. By copying or "dumping" data from one peripheral storage device to another, the failure of any single peripheral storage device will not prevent the availability of the dumped data to the processor.

A computer program for managing the availability of data and, in the preferred embodiment, a computer program including the invention as a subroutine therein is Data Facility Data Set Services (DFDSS), a storage management data facility in the Multiple Virtual Storage (MVS) operating system environment. A general description of DFDSS may be found in IBM Manual SH26-4388-1, DATA FACILITY DATA SET SERVICES VERSION 2 RELEASE 5.0, "User's Guide", and IBM Manual SC24-4389-1, DATA FACILITY DATA SET SERVICES VERSION 2 RELEASE 5.0, "Reference". DFDSS is an application program and includes instructions residing in the host processors. DFDSS is part of Data Facility System Managed Storage (DFSMS), which includes other facilities working together with or independently of DFDSS, such as Storage Management Subsystem (SMS), and Data Facility Hierarchical Storage Manager (DFHSM), described in IBM Manual SH35-0093-04, DATA FACILITY HIERARCHICAL STORAGE MANAGER, VERSION 2 RELEASE 5.0, "User's Guide". All of the aforementioned documents are hereby incorporated by reference.

DFDSS preserves data availability by making a copy of such data, typically in MSS 16 or tape 17. In dumping the data, the storage space used in the respective peripheral storage device is minimized by data compression. The data compression encoding technique is one that involves the replacement of identical consecutive runs of data bytes with codes. The precise encoding is not significant except that only identical consecutive runs of three or more data bytes are considered compressible. Thus, the invention detects identical consecutive runs of three or more data bytes, including the precise run length thereof.

Figure 2:
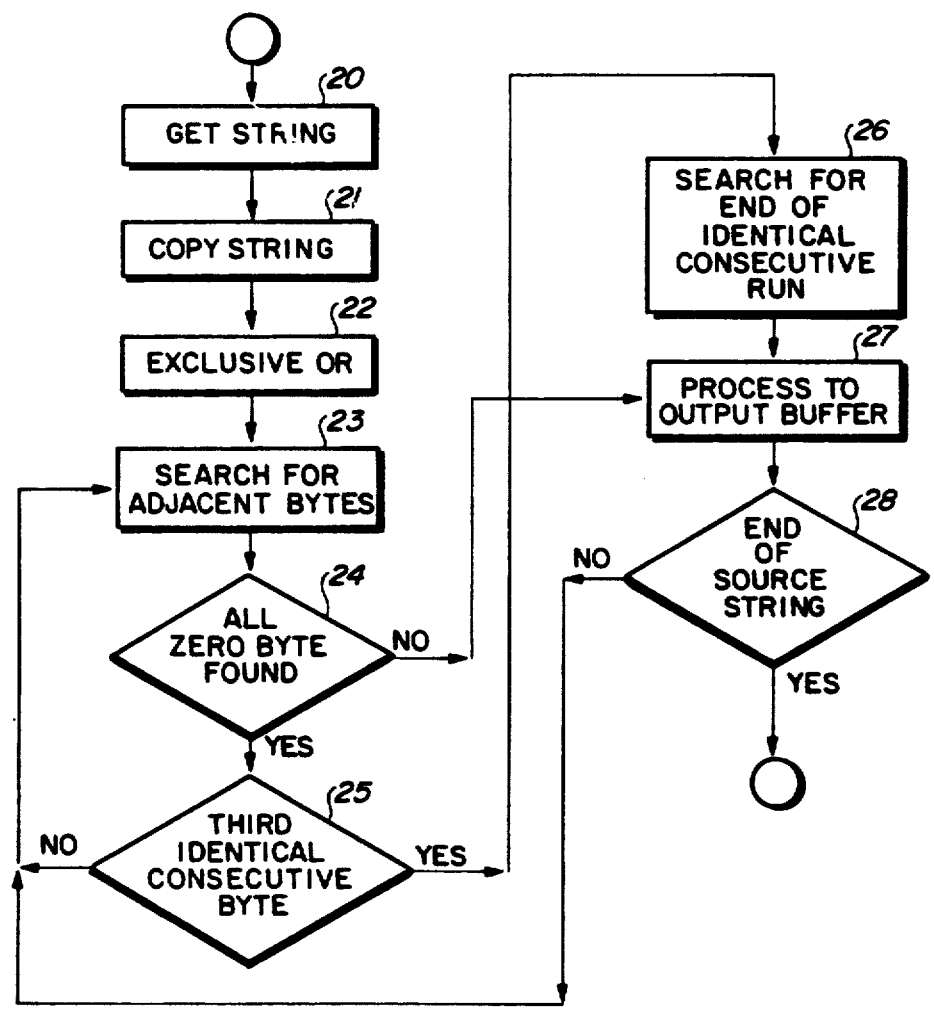
FIG. 2 is a flow chart of the method of the invention.

Referring to FIG. 2, the method of the invention will now be described as in the preferred embodiment for detecting identical consecutive runs of data for data compression. The method begins at step 20 where a source data string of an arbitrary number of bytes is brought into a location in an input buffer (not shown in FIG. 1). The precise number of bytes in the string is determined by a parameter controlled by the subroutine caller. At step 21, the source data string is copied into another location in the input buffer, thereby creating a temporary data string. A mere portion or "segment" of the source string may be copied as the temporary string if the constraints of the program so limit, as will be described. The copying can be accomplished in a single System/370 MOVE machine instruction, depending upon the size of the segment. In the preferred embodiment, a segment of 768 bytes of the source string is copied as the temporary string.

At step 22, a System/370 XOR instruction operates on the source string (except for the first byte thereof) and the temporary string. The first byte of the temporary string is XOR'd with the second byte of the source string, the second byte of the temporary string is XOR'd with the third byte of the source string, the third byte of the temporary string is XOR'd with the fourth byte of the source string, etc. This is the equivalent of XOR'ing each pair of adjacent bytes in the source string. XOR is a logical operation in which a logical zero is returned if the operands are identical and a logical one is returned if the operands are not identical. In operating on bytes, XOR returns an individual zero or one depending on the states of each pair of bits (for example, the first bit of each byte) therein. When two 8-bit bytes are XOR'd the result is also an 8-bit byte. If the two bytes XOR'd are identical the resulting byte is thus an all-zero byte. If the two bytes XOR'd are not identical the resulting byte is something other than an all-zero byte, and will vary depending on the similarity of the individual bits. When strings of 8-bit bytes are XOR'd the result is a string of 8-bit bytes, each resulting as just described. The results of the instruction are copied over into the temporary string, and is known as the comparison data string. Thus, a single machine instruction yields a comparison string resulting from logical XOR operations on each pair of adjacent bytes in the source data string.

At step 23, a single System/370 TRT instruction operates on the comparison string. The comparison string is searched for a pair of identical adjacent bytes. As previously described, a pair of identical adjacent bytes is indicated by a first all-zero byte in the comparison string. The search is sequential, meaning that the search starts at the beginning of the comparison string and continues byte for byte toward the end of the comparison string until an all-zero byte is located, thereby indicating the beginning of an identical consecutive run of bytes in the source string. Thus, a single machine instruction is used to locate the first identical adjacent pair of bytes in the source string, regardless of how many non-identical adjacent bytes precede such—except as constrained by the 256 byte limit of the System/370 architecture.

The TRT instruction uses each byte in the comparison string as an index into a table. The value of each byte in the comparison string points to a position in the table which in turn indicates the next action (as indicated in step 24). All positions in the table indicate the same next action, except that pointed to by an all-zero byte in the comparison string. In the preferred embodiment, a single TRT instruction can operate on a string of up to 256 bytes and the table is but 256 bytes long, but each may vary in length.

At step 24, the flow branches depending upon whether the TRT instruction of step 23 located a first all-zero byte in the comparison string. If a first all-zero byte is identified in the comparison string, the flow continues on to step 25 to determine if the very next byte in the comparison string is also an all-zero byte, thereby indicating the existence of a compressible run of identical consecutive bytes beginning with the pair of identical adjacent bytes in the source string represented by the first all-zero byte in the comparison string. If the entire comparison string is searched and an all-zero byte is not identified, the flow branches to step 27 as no identical consecutive runs of bytes exist in the source string. At step 27, the source string is copied from the input buffer to an output buffer. One exception is that when the end of a segment is reached without finding an all-zero byte, no immediate copying to the output buffer occurs, instead searching continues in the next segment. Because the source string contains no identical consecutive runs of bytes, the copied data is not compressed at all. Control codes recorded with the copied data indicates that the data is in uncompressed form.

At step 25, it is known that a pair of identical adjacent bytes exists in the source string. To be compressible, as stated previously, an identical consecutive run of at least three bytes is required. Thus, step 25 searches for a third identical consecutive byte. This is accomplished using a System/370 COMPARE IMMEDIATE instruction. The COMPARE IMMEDIATE instruction is only capable of operating on a single byte, not an entire string, but such is all that is required. The byte being operated on is compared to that specified at the outset of the instruction. At step 25, the COMPARE IMMEDIATE instruction is used to compare the byte of the comparison string immediately following the detected first all-zero byte to an all-zero byte. If the byte immediately following the detected first all-zero byte is also all-zero, there are at least three identical consecutive bytes in the source string and the identical consecutive run of bytes is compressible. The flow then continues on to step 26 to determine the run length of the identical consecutive run of bytes beginning with the pair of identical adjacent bytes in the source string represented by the first all-zero byte in the comparison string. Continuing from above, if the byte immediately following the detected first all-zero byte is not also all-zero, there are only two identical consecutive bytes in the source string (beginning and ending with the pair of identical adjacent bytes in the source string represented by the first all-zero byte in the comparison string) thus indicating that the identical consecutive run of bytes is not compressible. The flow then returns to step 23 wherein the comparison string is searched for the next pair of identical adjacent bytes. A single System/370 TRT instruction is again used, except that searching does not start at the beginning of the string. Instead, searching starts where step 25 left off. That is, searching starts at the byte in the comparison string immediately following the two bytes compared in step 25. This is possible because step 25 already determined that the two bytes compared therein are not identical and thus need not be searched again. The starting point at step 23 is similarly set for each subsequent cycle through steps 23-25 to avoid searching portions of the comparison string already searched during previous such cycles. Thus, steps 23-25 only look for an identical consecutive run of three or more bytes in that portion of the source string not already examined.

At step 26, the end of the identical consecutive run of bytes is identified. This is accomplished using the System/370 COMPARE IMMEDIATE and COMPARE LONG instructions. First, the COMPARE IMMEDIATE instruction is used to compare the next byte in the comparison string with the all-zero bytes of the identical consecutive run. In the preferred embodiment, individual COMPARE IMMEDIATE instructions are repeated until a non-all-zero byte is located in the comparison string, up to a maximum of eight repetitions. In alternative embodiments, any number of repetitions may be used. After the maximum number of repetitions, the COMPARE LONG instruction is used to locate a non-all-zero byte in the comparison string. The COMPARE LONG instruction is similar to the COMPARE IMMEDIATE instruction except that it operates over an entire pair of data strings. Here, the COMPARE LONG instruction is used to compare the remainder of the comparison string with the all-zero bytes of the identical consecutive run. Registers are used to track the starting address of the compared strings and the count from the end of the strings of the most recently compared bytes. If the end of the comparison string is reached without the identification of a non-all-zero byte therein, similar operations continue on the source string where the comparison string representing such left off. However, in the source string the object no longer is to identify a non-all-zero byte, but to actually identify a byte which is not identical to the source bytes in the identical consecutive run.

At step 27, the portion of the source string actually examined is stored in the output buffer. The portion of the source string actually examined is that portion examined for an identical consecutive run of three or more bytes since the last time step 27 was reached in the program flow. Step 27 is reached only when step 24 locates no identical adjacent pairs of bytes in the remainder of the source string, as already described, or following the location of the end of an identical consecutive run of three or more bytes in this source string in step 26. Thus, assuming that step 27 was reached after the completion of step 26, the portion of the source string stored in the output buffer will include a compressible run of bytes which may be preceded by a non-compressible run of bytes.

All runs of data are stored in the output buffer, but only those runs of data found to be compressible are stored in compressed form. Registers used during steps 23-26, in addition to those already mentioned, are used to identify the locations of the compressible and non-compressible runs of data. A control byte is stored with each run of data on the output buffer to indicate whether the run following the control byte is compressed or not, thereby permitting recovery of the data when necessary. In the preferred embodiment, three memory registers are used in the sequence of machine instructions implementing steps 23-26. The address of the first byte searched at step 23 is retained in one register and the address of the first byte in an identical consecutive run of three or more bytes, if any, is retained in a second register. A third register contains the address of the byte following the end of the identical consecutive run of three or more bytes, the first byte of which is indicated in the second register. The registers are used to compute the information required for the control bytes.

At step 28, the flow branches depending upon whether there remains any portion of the source string yet to be examined for the presence of compressible data. If such data remains, the flow returns to step 23 where the search for a pair of identical adjacent bytes in the comparison string starts from where step 27 left off. That is, searching starts at the byte in the comparison string immediately following the two bytes last compared in step 26. This is possible because step 25 already determined that the two bytes compared therein are not identical and thus need not be searched again. Again, the starting point at step 23 is similarly set for each subsequent cycle therethrough to avoid searching portions of the comparison string already searched during previous such cycles. If no data remains in the source string after step 27, step 28 ends the program.

Further information on the System/370 machine instructions disclosed herein can be found in IBM Manual SA22-7200-00, ENTERPRISE SYSTEM ARCHITECTURE/370, "Principles of Operation", hereby incorporated by reference.

In an alternative embodiment of the invention, the method and program are used to detect certain previously specified runs of data. Steps 20-22, as already described, remain unchanged. However, steps 23-26 are changed to a simple TRT instruction designed to branch only when the prescribed byte is located. For example, assume that it is desired to locate all adjacent occurrences of the characters "q" and "u", in that order, in the source string. The known exclusive OR result of the two bytes representing those characters is used in the table for the TRT instruction. All occurrences of such a result found in the comparison string are identified until the entire source string has been searched. Longer runs of data may be identified by additional COMPARE instructions. The identified occurrences may be used for data compression, or for other purposes, such as the simple location of certain words in a large block of text for word processing purposes.

While the invention has been described with respect to a preferred embodiment thereof, it will be understood by those skilled in the art that various changes in detail may be made therein without departing from the spirit, scope, and teaching of the invention. For example, the number of bytes in an identical, consecutive run of data need not always be three or more to be compressible. The memory space saved and the overhead associated with a particular data compression scheme will determine the precise number of identical, consecutive bytes required for compression to be practical. Also, the invention may be practiced by comparing any portion of a data string instead of a byte, such as individual bits. Finally, the invention may be practiced in any application where data compression is required, not just that for the preservation of data availability, or for other appropriate applications. Accordingly, the invention herein disclosed is to be limited only as specified in the following claims.

What is claimed is:

1. In a computer system having processing means and storage means, a computer-implemented method of detecting and compressing identical consecutive runs of data units in a data processing system data string having a sequence of said data units, the computer-implemented method comprising steps of:

exclusive-O-Ring by said processing means each consecutive pair of said data units in said sequence of data units to generate a comparison result for each said consecutive pair, said comparison result for each said consecutive pair having one of a first value indicating identical consecutive data units and a second value indicating different consecutive data units;

storing in said storage means each said comparison result for said sequence of data units in a comparison string having a corresponding sequence;

searching by said processing means said comparison string stored in said storage means to identify said comparison results having said first value, thereby locating identical consecutive runs of said data units in said sequence of data units in said data string; and compressing by said processing means the identical consecutive runs of data having a predetermined minimum run length in said sequence of data units in said data string located by said searching.

2. The method of claim 1 wherein the step of exclusive-ORing is a single machine instruction.

3. The method of claim 2 wherein the step of searching further comprises:

determining by said processing means if each consecutive pair of said data units is identical by examining said comparison string until a first identical consecutive pair of said data units is found, the first identical consecutive pair of said data units identifying the beginning of an identical consecutive run of said data units;

determining by said processing means if each consecutive pair of said data units subsequent to the first identical consecutive pair of said data units is identical by examining said comparison string until a first non-identical consecutive pair of said data units subsequent to the first identical consecutive pair of said data units is found, the first non-identical consecutive pair of said data units identifying the end of the identical consecutive run of said data units; and continually repeating by said processing means the two previous steps to identify each identical consecutive run of said data units in said data string, each repetition of the two previous steps beginning with the determination by said processing means of whether a first consecutive pair of said data units in which neither data unit was included in the last identified identical consecutive run of said data units is identical, the repetitions ending when the end of the data string is reached.

4. The method of claim 1 wherein the step of searching further comprises:

determining by said processing means if each consecutive pair of said data units is identical by examining said comparison string until a first identical consecutive pair of said data units is found, the first identical consecutive pair of said data units identifying the beginning of an identical consecutive run of said data units;

determining by said processing means if each consecutive pair of said data units subsequent to the first identical consecutive pair of said data units is identical by examining said comparison string until a first non-identical consecutive pair of said data units is found, the first non-identical consecutive pair of said data units identifying the end of the identical consecutive run of said data units; and continually repeating by said processing means the two previous steps to identify each identical consecutive run of said data units in said data string, each repetition of the two previous steps beginning with the determination by said processing means of whether a first consecutive pair of said data units in which neither data unit was included in the last identified identical consecutive run of said data units is identical, the repetitions ending when the end of the data string is reached.

* * * * *